(12) United States Patent
Oppelt et al.

(10) Patent No.: US 9,954,700 B2
(45) Date of Patent: Apr. 24, 2018

(54) TRANSMITTING A FREQUENCY-MODULATED SIGNAL

(71) Applicants: Ralph Oppelt, Uttenreuth (DE); Michael Wiehl, Ochsenfurt (DE)

(72) Inventors: Ralph Oppelt, Uttenreuth (DE); Michael Wiehl, Ochsenfurt (DE)

(73) Assignee: Siemens Aktiengesellschaft, München (DE)

( * ) Notice: Subject to any disclaimer, the term of this patent is extended or adjusted under 35 U.S.C. 154(b) by 379 days.

(21) Appl. No.: 14/602,239

(22) Filed: Jan. 21, 2015

(65) Prior Publication Data

US 2015/0207653 A1 Jul. 23, 2015

(30) Foreign Application Priority Data

Jan. 22, 2014 (DE) .................. 10 2014 201 119

(51) Int. Cl.
*H04L 27/12* (2006.01)
*H04L 5/00* (2006.01)
(Continued)

(52) U.S. Cl.
CPC ............ *H04L 27/12* (2013.01); *H04L 5/0048* (2013.01); *H04L 25/0226* (2013.01); *H04W 72/0453* (2013.01)

(58) Field of Classification Search
CPC ... H04L 27/12; H04L 5/0048; H04W 72/0453
See application file for complete search history.

(56) References Cited

U.S. PATENT DOCUMENTS 3,967,202 A * 6/1976 Batz .................. G01S 13/78
342/42
3,993,868 A * 11/1976 Balcewicz .......... H04L 27/2014
329/302
(Continued)

FOREIGN PATENT DOCUMENTS

DE 1160039 B 12/1963
DE 1160039 B 12/1963
(Continued)

OTHER PUBLICATIONS

German Search Report for German Application No. 10 2014 201 119.1, dated Mar. 26, 2014, with English Translation.
(Continued)

*Primary Examiner* — Andrew Lai
*Assistant Examiner* — Hoyet H Andrews, III
(74) *Attorney, Agent, or Firm* — Lempia Summerfield Katz LLC

(57) ABSTRACT

A transmitting apparatus for transmitting a frequency-modulated signal is provided. The transmitting apparatus includes a pilot tone generation device for generating a pilot tone. The transmitting apparatus also includes a modulation device for obtaining the generated pilot tone and a modulating useful signal and for generating a frequency-modulated signal based on a combination of the generated pilot tone and the modulating useful signal. The generated pilot tone has a frequency outside a frequency range of the modulating useful signal in order to vary a frequency range of the frequency-modulated signal.

17 Claims, 2 Drawing Sheets

(51) Int. Cl.
*H04L 25/02* (2006.01)
*H04W 72/04* (2009.01)

(56) References Cited

U.S. PATENT DOCUMENTS

| | | | | |
|---|---|---|---|---|
| 4,686,490 A * | 8/1987 | Cressey | ............... | H04L 27/12 |
| | | | | 332/101 |
| 5,053,776 A * | 10/1991 | Mawhinney | ............ | C21B 7/24 |
| | | | | 342/118 |
| 5,387,918 A * | 2/1995 | Wiesbeck | ............ | G01S 7/4004 |
| | | | | 342/128 |
| 5,598,274 A * | 1/1997 | Ogura | ............... | H04N 9/896 |
| | | | | 386/207 |
| 5,844,939 A * | 12/1998 | Scherer | ............... | H03D 7/163 |
| | | | | 375/219 |
| 5,956,318 A * | 9/1999 | Saeki | ............... | H04L 27/2613 |
| | | | | 370/206 |
| 6,008,703 A * | 12/1999 | Perrott | ............... | H03C 3/0925 |
| | | | | 331/16 |
| 6,600,382 B1 * | 7/2003 | Klymyshyn | ........ | H04L 27/2017 |
| | | | | 332/100 |
| 7,123,009 B1 * | 10/2006 | Scott | ............... | G01R 33/3621 |
| | | | | 324/311 |
| 7,323,876 B2 * | 1/2008 | Den Boef | .......... | G01R 33/3621 |
| | | | | 324/318 |
| 7,529,363 B2 * | 5/2009 | Pessoa | ............... | H04Q 1/4575 |
| | | | | 379/142.18 |
| 7,904,019 B2 * | 3/2011 | Kwak | ............... | H04H 20/02 |
| | | | | 455/13.1 |
| 2004/0047370 A1 * | 3/2004 | Pessoa | ............... | H04Q 1/4575 |
| | | | | 370/526 |
| 2006/0244452 A1 * | 11/2006 | Den Boef | .......... | G01R 33/3621 |
| | | | | 324/322 |
| 2007/0058157 A1 * | 3/2007 | Deines | ............... | G01P 3/366 |
| | | | | 356/28 |
| 2010/0231979 A1 * | 9/2010 | Nagase | ............... | G06T 5/002 |
| | | | | 358/3.26 |
| 2010/0244975 A1 * | 9/2010 | Kunii | ............... | H03B 23/00 |
| | | | | 332/117 |
| 2010/0309051 A1 * | 12/2010 | Moshfeghi | ............ | G01S 5/0236 |
| | | | | 342/378 |

FOREIGN PATENT DOCUMENTS

| | | |
|---|---|---|
| DE | 1230471 B | 12/1966 |
| DE | 1230471 B | 12/1966 |
| DE | 2460761 A1 | 7/1976 |
| DE | 2460761 A1 | 7/1976 |

OTHER PUBLICATIONS

Kammeyer, Nachrichtenübertragung, 5. Auflage, S. 607; 2011.
Tu Ilmenau; "Informationselektronisches Praktikum—Messung von Empfängerkenngröβen"; recherchiert am Mar. 25, 2014 im Internet: URL:http://www-emt.tu-ilmenau.de; pp. 1-15; 2000.

* cited by examiner

TRANSMITTING A FREQUENCY-MODULATED SIGNAL

This application claims the benefit of DE 10 2014 201 119.1, filed on Jan. 22, 2014, which is hereby incorporated by reference in its entirety.

BACKGROUND

The present embodiments relate to transmitting a frequency-modulated signal.

In radio transmission systems, frequency modulation may be used as the modulation method. However, the carrier or carrier signals may be occasionally extinguished at the receiving antenna when transmitting data in the event of multipath propagation in the radio channel. As a result, the noise floor in the demodulated signal is increased significantly, and the transmitted signal may not be used further. Therefore, the carrier and, for example, the useful signal transmitted by the carrier may be permanently extinguished (e.g., in the case of static transmission channels in which the frequency changes slightly or does not change at all).

DE 1 230 471 B discloses the practice of erecting radio masts in an offset manner such that the dead zones occurring at particular locations as a result of multipath reception are compensated for again by the transmitted signal from another transmitter. In this case, the two transmitters transmit at the same frequency.

Transmission using pilot tones may be used in digital transmission methods (e.g., coded orthogonal frequency-division multiplexing (COFDM)). In this case, individual carriers of the multicarrier method are used as pilot tones. The pilot tones are used to estimate the channel transfer function (see Kammeyer, "Nachrichtenübertragung", 5th edition, page 607). However, the use and evaluation of the pilot tones differ entirely from the use in analog transmission methods. In this case, a pilot tone is not used to modulate the carrier but rather for the deliberate transmission of a signal for continuous channel estimation. This signal is known to the receiver.

SUMMARY AND DESCRIPTION

The scope of the present invention is defined solely by the appended claims and is not affected to any degree by the statements within this summary.

The present embodiments may obviate one or more of the drawbacks or limitations in the related art. For example, secure and reliable analog transmission of signals in which extinguishing of the signals at the receiver is reduced is enabled.

Accordingly, a transmitting apparatus for transmitting a frequency-modulated signal is provided. The transmitting apparatus includes a pilot tone generation device for generating a pilot tone, and a modulation device for obtaining the generated pilot tone and a modulating useful signal. The modulation device is also for generating a frequency-modulated signal based on a combination of the generated pilot tone and the modulating useful signal. In this case, the generated pilot tone has a frequency outside the frequency range of the modulating useful signal in order to vary the frequency range of the frequency-modulated signal.

In this case, the term "obtain" may be that the generated pilot tone and the useful signal are fed into the modulation device.

As already explained, in the case of a radio channel that is used to transmit a frequency-modulated signal, the frequency-modulated signal (e.g., frequency-modulated carrier signal or FM carrier below) may be greatly attenuated or even extinguished as a result of a plurality of signals being superimposed at the receiver in the event of multipath propagation. Multipath reception or multipath propagation, as may occur at a receiver, provides that electromagnetic waves from a transmitter are deflected by reflectors (e.g., buildings; metal smooth surfaces) and arrive at the receiver on different paths. As a result, the direct signal is mixed with the different temporally offset reflected echo signals.

A highly frequency-modulated carrier periodically runs through the extinguishing frequency. The consequence is interference spikes after demodulation at the receiver. These may be easily corrected with the aid of linear interpolation if the interference spikes do not last for long. This correction is justified since the interference spikes have frequency components that are not to occur at all. This fault may be detected and rectified using this a priori knowledge.

However, since a small-amplitude measurement signal is mostly transmitted (e.g., in static or virtually static channels, as occur during MR transmission in a magnetic resonance tomograph), the carrier is scarcely modulated. Therefore, in this case, the carrier may linger in a static radio channel at the extinguishing frequency for the data transmission duration. The transmission therefore has interference. In order to prevent this, the frequency of the carrier is to be permanently varied, even in the case of a small-amplitude modulating signal.

According to the transmitting apparatus of one or more of the present embodiments, this is achieved by channel matching. In this case, a pilot tone generation device generates a pilot tone. The pilot tone is added to the modulating useful signal such that a minimum frequency deviation is always provided. A minimum frequency deviation may be a minimum change in the frequency range of the carrier signal (e.g., of the frequency-modulated signal).

Although the situation in which the frequency-modulated signal is briefly extinguished at the receiver may occur, this will not occur over the entire transmission period on account of this change or variation of the frequency range.

According to one embodiment, the pilot tone generation device includes a determination device for determining the frequency of the pilot tone.

The determination device may stipulate the intended frequency of the pilot tone. The determination device may alternatively set this frequency.

According to another embodiment, the pilot tone generation device is configured to generate the pilot tone such that a frequency of the pilot tone is above the frequency range of the modulating useful signal.

According to another embodiment, the pilot tone generation device is configured to generate the pilot tone such that a frequency of the pilot tone is below the frequency range of the modulating useful signal.

Depending on the frequency range of the useful signal, the pilot tone generation device may arrange the pilot tone above or below the frequency range of the useful signal. If the pilot tone below the frequency range of the useful signal is selected, harmonics of the pilot tone should not fall in the useful band. The pilot tone should then therefore be a purely sinusoidal tone after filtering. If the pilot tone above the frequency range is selected, the assigned frequency range provided should not be exceeded at a maximum amplitude of the pilot tone.

A pilot tone below the frequency range of the useful signal may be technically more difficult to implement. Therefore, a pilot tone above or below the frequency range of the useful signal may be selected depending on the technical feasibility and based on the frequency or frequency range of the useful signal.

According to another embodiment, the pilot tone generation device includes a setting device for setting an amplitude of the pilot tone. The setting device may be combined with the determination device. In this case, both the frequency and the amplitude of the pilot tone is controlled or regulated by one unit.

Varying the amplitude makes it possible to adapt the power of the pilot tone. The amplitude of the pilot tone may therefore be adapted based on the power of the useful signal.

According to another embodiment, the setting device is set up to set the amplitude of the pilot tone based on a predefined value of the amplitude.

According to this embodiment, a pilot tone having the same amplitude or power is used for each transmission of a useful signal.

According to another embodiment, the pilot tone generation device includes a determination device for determining a power of the modulating useful signal.

The determination device may determine the amplitude of the modulating useful signal. For example, the determination device may include a log power detector for this purpose.

According to another embodiment, the setting device is configured to set the amplitude of the pilot tone based on the determined power.

In this manner, the amplitude of the pilot tone may be increased in the case of a weak useful signal and may be reduced in the case of a strong useful signal. A weak useful signal corresponds to a low amplitude of the modulating useful signal. Adapting the amplitude of the pilot tone makes it possible to keep the total signal power at a similar or identical value.

According to another embodiment, the setting device includes an oscillator for setting the amplitude and the frequency of the pilot tone.

An oscillator may be used to implement both the setting device and the determination device.

According to another embodiment, the pilot tone generation device includes a filter device configured to supply the pilot tone to the modulation device.

The filter device is configured such that only the pilot tone is forwarded to the modulation device on this path of the transmitting apparatus. The filter device may have a bandpass filter for this purpose, for example.

According to another embodiment, the transmitting apparatus has a filter unit configured to supply the useful signal to the modulation device.

Only the useful signal is therefore forwarded to the modulation device on this path of the transmitting apparatus. The filter unit may have a low-pass filter, a bandpass filter or a high-pass filter for this purpose. This depends on the frequency of the pilot tone and on the frequency range of the useful signal.

Another aspect provides a transmitting/receiving system. The transmitting/receiving system includes a transmitting apparatus having the above-described features for transmitting a frequency-modulated signal, and a receiving apparatus for receiving and demodulating the frequency-modulated signal.

In order to demodulate the frequency-modulated signal, the receiving apparatus may have a demodulation device.

According to one embodiment, the transmitting/receiving system is arranged in a magnetic resonance tomograph.

A static channel may occur in a magnetic resonance tomograph. The described transmitting apparatus is advantageous in this case. However, the transmitting apparatus may also be used in any other system in which carrier signals may be extinguished.

According to another embodiment, the receiving apparatus includes a filter device for filtering a demodulated received signal in order to recover the useful signal (e.g., without a pilot tone).

The filter device is configured such that the filter device hides the pilot tone and lets through only the useful signal. For example, the filter device may have a low-pass filter, a bandpass filter or a high-pass filter.

The receiving apparatus may also determine or monitor the frequency of the pilot tone and may set the filter device based on the determined frequency.

Another aspect provides a method for transmitting a frequency-modulated signal. A pilot tone is generated in a first act of the method. The generated pilot tone and a modulating useful signal are obtained in a second act. In a third act, a frequency-modulated signal is generated based on a combination of the generated pilot tone and the modulating useful signal. In this case, the generated pilot tone has a frequency outside the frequency range of the modulating useful signal in order to vary the frequency range of the frequency-modulated signal.

A computer program product that causes the method explained above to be carried out on a program-controlled device is also provided.

A computer program product (e.g., a computer program) may be provided or delivered, for example, in the form of a storage medium (e.g., a memory card, a USB stick, a CD-ROM, a DVD), or else in the form of a downloadable file from a server in a network. This may be effected, for example, in a wireless communication network, by transmitting a corresponding file containing the computer program product or the computer program.

The embodiments and features described for the apparatus accordingly apply to the method.

Further possible implementations also include not explicitly mentioned combinations of features or embodiments described above or below with respect to the exemplary embodiments. In this case, a person skilled in the art will also add individual aspects as improvements or additions.

The exemplary embodiments that are described below relate to further advantageous refinements and aspects.

DETAILED DESCRIPTION

In the figures, same or functionally same elements have been provided with the same reference symbols unless indicated otherwise.

Figure 1:
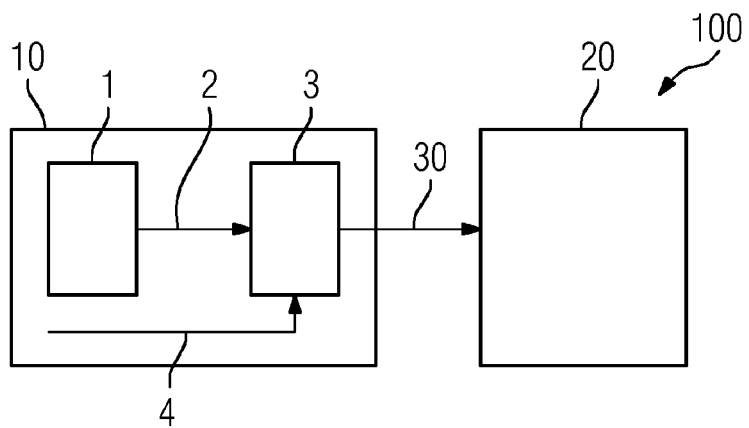
FIG. 1 shows a schematic block diagram of an exemplary embodiment of a transmitting/receiving system.

FIG. 1 shows one embodiment of a transmitting/receiving system 100. In this transmitting/receiving system 100, signals 30 are transmitted between a transmitting apparatus 10 and a receiving apparatus 20. The transmission channel used for this purpose may be static.

The transmitting apparatus 10 has a modulation device 3 that modulates a useful signal 4 to be transmitted. Frequency modulation is used for this purpose.

Since some frequencies of the received signal 30 may be extinguished at the receiving apparatus 20 (e.g., receiver) on account of multipath propagation, a pilot tone 2 is added to the useful signal 4 to be transmitted. This pilot tone is used to vary the frequency range of the frequency-modulated signal 30. In this manner, a minimum frequency deviation of the signal 30 may be achieved even in static transmission channels in which the frequency is not changed.

In order to generate the pilot tone 2, the transmitting apparatus 10 has a pilot tone generation device 1. This is explained in yet more detail in connection with the following figures.

The modulation device 3 combines the pilot tone 2 and the modulating useful signal 4 and carries out the frequency modulation on the combined signal in order to generate the frequency-modulated signal 30 to be transmitted.

The receiving apparatus 20 receives the signal 30 and demodulates the signal 30. The receiving apparatus is explained in more detail in FIG. 6.

Figure 2:
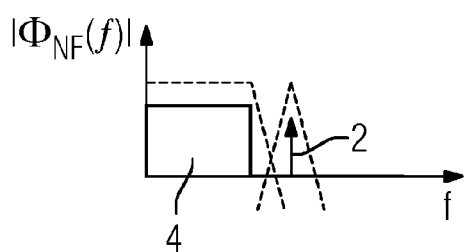
FIGS. 2 and 3 show graphs containing exemplary frequency ranges of a useful signal and of a pilot tone.
Figure 3:
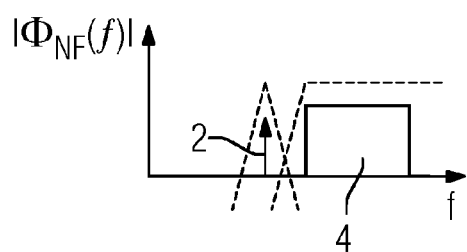

As already explained, a pilot tone 2, the amplitude of which is either constant or variable, is added to the modulating signal 4. The exemplary spectra illustrated in FIGS. 2 and 3 show how the pilot tone 2 may be inserted. In FIG. 2, the pilot tone 2 is transmitted above the useful band to be transmitted (e.g., the modulating signal 4, at a higher frequency). In FIG. 3, the pilot tone is transmitted below the modulating signal 4 (e.g., between the useful band and the frequency of 0 Hz, the frequency of DC voltage).

Figure 4:
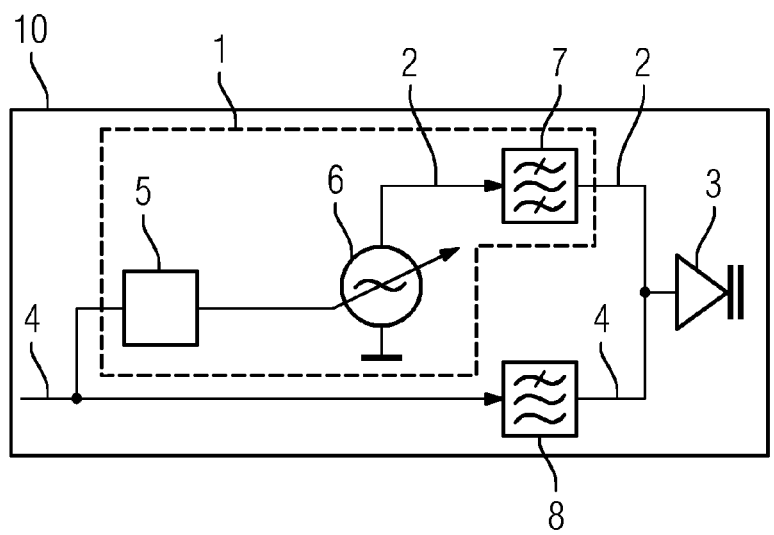
FIG. 4 shows a schematic block diagram of a first exemplary embodiment of a transmitting apparatus of the transmitting/receiving system from FIG. 1.

FIG. 4 shows an exemplary embodiment of the transmitting apparatus 10 in which a variable pilot tone 2 is added.

In this case, the pilot tone generation device 1 includes a determination unit or power measuring circuit 5 in order to detect the power of the useful signal 4 to be transmitted.

This power measuring circuit 5 controls the output power of an oscillator 6 that generates the pilot tone 2. The pilot tone 2 is then supplied to the modulation device 3 (e.g., modulator) via a bandpass filter 7.

The useful signal 4 is supplied to the modulator 3 via an associated filter 8 that is impermeable to the pilot tone 2. In the exemplary embodiment shown, the filter 8 is a low-pass filter.

The spectrum shown in FIG. 2 shows, by way of example, the filter transfer functions belonging to the block diagram in FIG. 4 as dashed lines.

Figure 5:
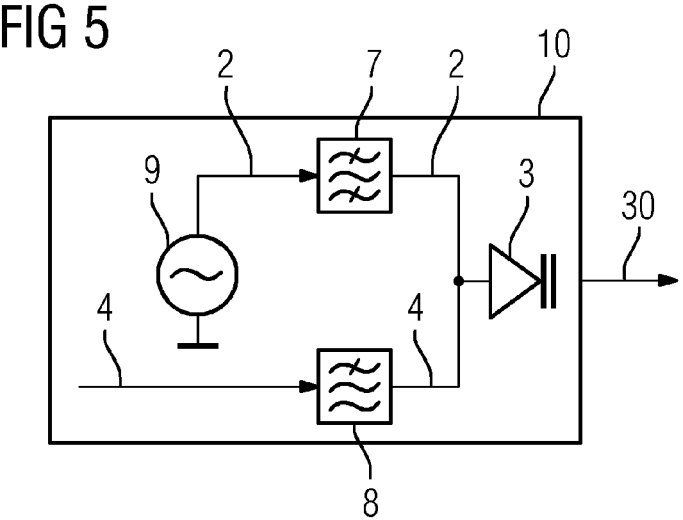
FIG. 5 shows a schematic block diagram of a second exemplary embodiment of a transmitting apparatus of the transmitting/receiving system from FIG. 1.

Alternatively, a fixed-amplitude pilot tone 2 may also be transmitted. This is implemented in the transmitting apparatus 10 shown in FIG. 5. In this case, a fixed amplitude and a fixed frequency for the pilot tone 2 are set at the oscillator 9.

Figure 6:
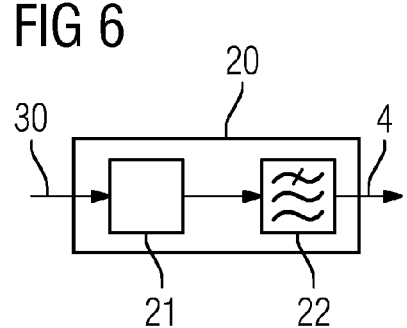
FIG. 6 shows a schematic block diagram of an exemplary embodiment of a receiving apparatus of the transmitting/receiving system from FIG. 1.

An exemplary embodiment of a receiving apparatus 20 is shown in FIG. 6. The received signal 30 is demodulated in a demodulation device or demodulator 21. The useful signal 4 is then recovered using a filter device 22 (e.g., a low-pass filter). The pilot tone 2 is suppressed in this case.

The filter device 22 in the receiver 20 is to match the filter device 8 in the transmitter 10 in order to be able to accordingly suppress the pilot tone 2.

Figure 7:
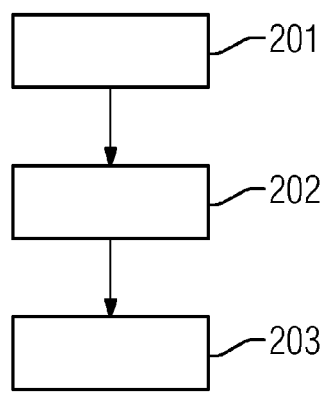
FIG. 7 shows a schematic flowchart of one embodiment of a method for transmitting a frequency-modulated signal.

FIG. 7 shows one embodiment of a method for transmitting a frequency-modulated signal 30. This method may be carried out in the transmitting/receiving system from FIG. 1.

A pilot tone 2 is generated in act 201.

The generated pilot tone 2 and a modulating useful signal 4 are fed into the modulation device 3 in act 202.

In act 203, a frequency-modulated signal 30 is generated based on a combination of the generated pilot tone 2 and the modulating useful signal 4. The generated pilot tone 2 has a frequency outside the frequency range of the modulating useful signal 4 in order to vary the frequency range of the frequency-modulated signal 30.

These acts may also be carried out in another order or at the same time.

Although the present invention was described using exemplary embodiments, the invention may be modified in various ways.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A transmitting apparatus for transmitting a frequency-modulated signal, the transmitting apparatus comprising:
   a pilot tone generation device configured to generate a pilot tone, the pilot tone generating device comprising a setting device configured to set an amplitude of the pilot tone; and
   a modulation device configured to obtain the generated pilot tone and a modulating signal and configured to generate the frequency-modulated signal based on a combination of the generated pilot tone and the modulating signal,
   wherein the generated pilot tone has a frequency outside a frequency range of the modulating signal in order to vary a frequency range of the frequency-modulated signal,
   wherein the pilot tone generation device comprises a determination device configured to determine a power of the modulating signal, and
   wherein the setting device is configured to set the amplitude of the pilot tone based on the determined power.

2. The transmitting apparatus of claim 1, wherein the generated pilot tone has the frequency outside the frequency range of the modulating signal in order to vary the frequency range of the frequency-modulated signal, such that a minimum frequency deviation of the frequency range of the frequency-modulated signal is achieved.

3. The transmitting apparatus of claim 1, wherein the pilot tone generation device comprises a determination device configured to determine a frequency of the pilot tone.

4. The transmitting apparatus of claim 1, wherein the pilot tone generation device is configured to generate the pilot tone such that a frequency of the pilot tone is above the frequency range of the modulating signal.

5. The transmitting apparatus of claim 1, wherein the pilot tone generation device is configured to generate the pilot tone such that a frequency of the pilot tone is below the frequency range of the modulating signal.

6. The transmitting apparatus of claim 1, wherein the setting device is configured to set the amplitude of the pilot tone based on a predefined value of the amplitude.

7. The transmitting apparatus of claim 1, wherein the setting device comprises an oscillator configured to set the amplitude and a frequency of the pilot tone.

8. The transmitting apparatus of claim 1, wherein the pilot tone generation device comprises a filter device configured to supply the pilot tone to the modulation device.

9. The transmitting apparatus of claim 1, further comprising a filter unit configured to supply the signal to the modulation device.

10. The transmitting/receiving system of claim 9, wherein the transmitting/receiving system is arranged in a magnetic resonance tomograph.

11. A transmitting/receiving system comprising:
   a transmitting apparatus for transmitting a frequency-modulated signal, the transmitting apparatus comprising:
      a pilot tone generation device configured to generate a pilot tone, the pilot tone generation device comprising a setting device configured to set an amplitude of the pilot tone; and
      a modulation device configured to obtain the generated pilot tone and a modulating signal and configured to generate the frequency-modulated signal based on a combination of the generated pilot tone and the modulating signal, wherein the generated pilot tone has a frequency outside a frequency range of the modulating signal in order to vary a frequency range of the frequency-modulated signal; and
   a receiving apparatus configured to receive and demodulate the frequency-modulated signal,
   wherein the pilot tone generation device comprises a determination device configured to determine a power of the modulating signal, and
   wherein the setting device is configured to set the amplitude of the pilot tone based on the determined power.

12. The transmitting/receiving system of claim 11, wherein the receiving apparatus comprises a filter device configured to filter a demodulated received signal in order to recover the modulating signal.

13. A method for transmitting a frequency-modulated signal, the method comprising:
   generating a pilot tone;
   obtaining the generated pilot tone and a modulating signal; and
   generating a frequency-modulated signal based on a combination of the generated pilot tone and the modulating signal,
   wherein the generated pilot tone has a frequency outside a frequency range of the modulating signal in order to vary a frequency range of the frequency-modulated signal, and
   wherein generating the pilot tone further comprises setting an amplitude of the pilot tone based on a determined power of the modulating signal.

14. The method of claim 13, wherein the generated pilot tone has the frequency outside the frequency range of the modulating signal in order to vary the frequency range of the frequency-modulated signal, such that a minimum frequency deviation of the frequency range of the frequency-modulated signal is achieved.

15. A transmitting apparatus for transmitting a frequency-modulated signal, the transmitting apparatus comprising:
   a pilot tone generation device configured to generate a pilot tone; and
   a modulation device configured to obtain the generated pilot tone and a modulating signal and configured to generate the frequency-modulated signal based on a combination of the generated pilot tone and the modulating signal, such that a minimum frequency deviation is always provided, the minimum frequency deviation being a minimum change in a frequency range of the frequency-modulated signal,
   wherein the generated pilot tone has a frequency outside a frequency range of the modulating signal in order to vary a frequency range of the frequency-modulated signal.

16. The transmitting apparatus of claim 15, wherein the modulation device is further configured to generate the frequency-modulated signal based on a combination of the generated pilot tone and the modulating signal, such that the frequency-modulated signal periodically runs through an extinguishing frequency.

17. The transmitting apparatus of claim 16, wherein the extinguishing frequency through which the frequency-modulated signal runs is a function of multipath propagation in a radio channel of the frequency-modulated signal.

* * * * *